US012699545B2

(12) United States Patent
    Ikarashi

(10) Patent No.: US 12,699,545 B2
(45) Date of Patent: Aug. 4, 2026

(54) SECURE SELECTIVE PRODUCT COMPUTATION SYSTEM, SECURE SELECTIVE PRODUCT COMPUTATION METHOD, SECURE COMPUTATION APPARATUS, AND PROGRAM

(71) Applicant: NTT, Inc., Tokyo (JP)

(72) Inventor: Dai Ikarashi, Musashino (JP)

(73) Assignee: NTT, Inc., Tokyo (JP)

( * ) Notice: Subject to any disclaimer, the term of this patent is extended or adjusted under 35 U.S.C. 154(b) by 1027 days.

(21) Appl. No.: 17/791,228

(22) PCT Filed: Jan. 20, 2020

(86) PCT No.: PCT/JP2020/001677
    § 371 (c)(1),
    (2) Date: Jul. 7, 2022

(87) PCT Pub. No.: WO2021/149101
    PCT Pub. Date: Jul. 29, 2021

(65) Prior Publication Data
    US 2023/0036496 A1     Feb. 2, 2023

(51) Int. Cl.
    *G06F 7/72* (2006.01)
    *H04L 9/10* (2006.01)

(52) U.S. Cl.
    CPC . *G06F 7/72* (2013.01); *H04L 9/10* (2013.01)

(58) Field of Classification Search
    CPC .................................... G06F 7/72; H04L 9/10
    See application file for complete search history.

(56) References Cited

FOREIGN PATENT DOCUMENTS

WO     WO-2018036967 A1 *   3/2018   ............... G06F 7/72

OTHER PUBLICATIONS

Liina Kamm et al., "Secure floating point arithmetic and private satellite collision analysis", International Journal of Information Security, 2015, vol. 14, pp. 531-548, total 18 pages, DOI 10.1007/s100207-014-0271-8.

(Continued)

*Primary Examiner* — Michael D. Yaary
(74) *Attorney, Agent, or Firm* — XSENSUS LLP

(57)     ABSTRACT

A secure selective product computation system (100) has conditions $[c_0], \ldots, [c_{n-1}]$ and a binary table including $m_{0,0}$, $m_{0,1}, \ldots, m_{n-1,0}$, and $m_{n-1,1}$ as inputs, and outputs a total product $[A]$ of multipliers selected according to the conditions. A condition integrator (11) calculates share values $[c_i c_{i+1}]$. A table convertor (12) generates a 4-value table including $m'_{00}, m'_{01}, m'_{10}$, and $m'_{11}$ A public value multiplier (13) calculates $[ai]:=[c_i c_{i+1}](m_{00}+m_{11}-m_{01}-m_{10})+[c_i](m_{i+1,0}-m_{i,0})+[c_{i+1}](m_{i,1}-m_{i,0})+m_{i,0}$. A real number multiplier (14) calculates a value $[A]$ obtained by multiplying all $[a_i]$. A selective multiplier (15) multiplies $[A]$ by a multiplier selected from multipliers $m_{n-1,0}$ and $m_{n-1,1}$ according to $c_{n-1}$ when n is an odd number.

3 Claims, 4 Drawing Sheets

(56)  References Cited

OTHER PUBLICATIONS

Mehrdad Aliasgari et al., "Secure Computation on Floating Point Numbers", 2012, total 31 pages.

Dai Ikarashi, "Secure Real No. Operations for Secure Al—O(|p|)-Bit Communication and O(1)-Round Right Shift Protocol-", CSS2019, 2019, 16 pages including English Translation.

* cited by examiner

SECURE SELECTIVE PRODUCT COMPUTATION SYSTEM 100

SECURE SELECTIVE PRODUCT COMPUTATION METHOD

SECURE SELECTIVE PRODUCT COMPUTATION SYSTEM, SECURE SELECTIVE PRODUCT COMPUTATION METHOD, SECURE COMPUTATION APPARATUS, AND PROGRAM

CROSS-REFERENCE TO RELATED APPLICATION

The present application is based on PCT filing PCT/JP2020/001677, filed Jan. 20, 2020, the entire contents of which are incorporated herein by reference.

TECHNICAL FIELD

The present invention relates to a technology for calculating a selective product in secure computation.

BACKGROUND ART

Secure computation is a cryptographic technology for calculating any function while hiding data. A data utilization form is expected to be developed taking advantage of this feature so that data does not leak to either a system operator or a data user. There are several schemes for secure computation, and among them, the schemes including secret sharing as a component are known to have a small data processing unit and be able to perform high-speed processing.

Secret sharing is a method of converting secret information into several fragments called shares. For example, there is secret sharing called a (k, n) threshold method in which n shares are generated from the secret information and secrets can be restored from k or more shares, and thus, secret information is not leaked as long as the number of shares to restore the secret information is smaller than k. Shamir secret sharing, duplicate secret sharing, and the like are known as specific methods for configuring secret sharing. In the present specification, one fragment of a value shared by secret sharing is referred to as "share". Further, an entire set of all shares is called a "share value".

In recent years, research on advanced statistics or machine learning using secure computation has been actively performed. However, most of calculations thereof include calculations of an inverse, a square root, an exponent, a logarithm, and the like, going beyond calculations good for secure computation such as addition, subtraction, and multiplication. The selective product is a calculation in which an operation for referring to and selecting a value from a binary table consisting of public values a plurality of times, and multiplying reference results. The selective product is used, for example, when an exponential function is calculated in secure computation. NPL 1 discloses a method of calculating an exponential function in secure computation, in which calculation of a selective product is used.

CITATION LIST

Non Patent Literature

NPL 1: Dai Ikarashi, "Secure Real Number Operations for Secure AI-O(|p|)-Bit Communication and O(1)—Round Right Shift Protocol—", CSS2019, 2019

SUMMARY OF THE INVENTION

Technical Problem

However, a method disclosed in NPL 1 is computationally expensive.

An object of the present invention is to provide a secure computation technology capable of calculating a selective product at high speed in view of the above technical difficulties.

Means for Solving the Problem

In order to solve the above problems, a secure product computation system of an aspect of the present invention includes a plurality of secure computation apparatuses, receives a sequence of share values $[c_0], \ldots, [c_{n-1}]$ of n conditions $c_0, \ldots, c_{n-1}$ and a binary table including multipliers $m_{0,0}, m_{0,1}, \ldots, m_{n-1,0}$, and $m_{n-1,1}$ associating two multipliers of the multipliers with each of the conditions as inputs, and outputs a share value [A] of a total product of the multipliers selected according to the conditions. The secure computation apparatus includes a condition integration unit configured to calculate share values $[c_i c_{i+1}]$ obtained by multiplying the share values $[c_i]$ and the share values $[c_{i+1}]$ where i is an even number equal to or greater than 0 or smaller than n; a table conversion unit configured to generate a 4-value table including $m'_{00}, m'_{01}, m'_{10}$, and $m'_{11}$ where $m'_{00}:=m_{i,0}m_{i+1,0}$, $m'_{01}:=m_{i,0}m_{i+1,1}$, $m'_{10}:=m_{i,1}m_{i+1,0}$, and $m'_{11}:=m_{i,1}m_{i+1,1}$ and i is an even number equal to or greater than 0 or smaller than n; a public value multiplication unit configured to generate share values $[a_i]$ of values $a_i$ obtained by calculating $[c_i c_{i+1}](m_{00}+m_{11}-m_{01}-m_{10})+[c_i](m_{i+1,0}-m_{i,0})+[c_{i+1}](m_{i,1}-m_{i,0})+m_{i,0}$ where i is an even number equal to or greater than 0 or smaller than n; a real number multiplication unit configured to calculate a share value [A] of a value A obtained by multiplying all the share values $[a_i]$; and a selective multiplication unit configured to multiply the share value [A] by a multiplier selected from multipliers $m_{n-1,1}$ and $m_{n-1,0}$ according to a condition $c_{n-1}$ when n is an odd number.

Effects of the Invention

According to the present invention, the selective product can be calculated at high speed in the secure computation.

DESCRIPTION OF EMBODIMENTS

Figure 1:
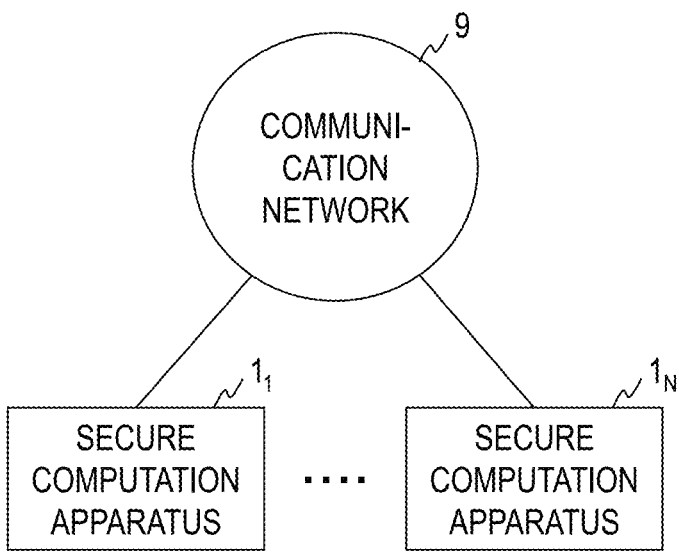
FIG. 1 is a diagram illustrating a functional configuration of a secure selective product computation system.

Hereinafter, embodiments of the present invention will be described in detail. In the drawings, components having the same function are denoted by the same numbers, and duplicate description thereof will be omitted.

In the present specification, the following notation is used. [■] is data in which a numerical value ■ is hidden. For example, share values of Shamir secret sharing, duplicate secret sharing, or the like can be used.

[a?b:c] indicates b when a=1 and c when a=0.

$$\neg, \wedge, \vee, \oplus$$ [Math. 1]

Symbols described above indicate a logical negation (NOT), a logical product (AND), a logical sum (OR), and an exclusive OR (XOR), respectively.

An integer in a ring can be regarded as a fixed-point real number by setting a public decimal point position for the integer. In the present invention, the fixed-point real number represented in the ring in this way is simply referred to as a real number.

Embodiment: Secure Selective Product Computation System

In an embodiments of the present invention, a secure selective product computation system and method is provided in which a sequence of share values of n conditions and a binary table consisting of two public values corresponding to each condition are input, and a share value of a value obtained by multiplying all reference results by referencing the binary table according to each condition is output. Hereinafter, an overview of a selective public multiplication protocol executed by the secure selective product computation system of the embodiment will be described.

In calculation of an exponential function, for example, processing for performing a plurality of operations of referencing and selecting a value from a binary table consisting of public values using a secure truth value, and multiplying respective reference results is performed. Hereinafter, this processing will be referred to as "exponentiation by referring to a binary public table". In such a case, it is efficient to combine two binary tables and refer to a four-value table. Because combining two binary tables into a four-value table is a public value calculation, this can be processed with high accuracy. This method is also advantageous in terms of accuracy because the number of times of real number multiplication in secure computation is reduced. An algorithm for exponentiation by referring to a binary public table executed in the present invention is shown hereinafter.

Algorithm 1: Exponentiation by Referring to Binary Public Table

Input: Multipliers $m_{00}$, $m_{0,1}$, . . . , $m_{n-1,0}$, $m_{n-1,1}$ and condition $[c_0]$, . . . , $[c_{n-1}]$ Output:

$$\left[ \prod_{0 \leq i < n} (c_i ? \; m_{i,1} : m_{i,0}) \right] \qquad \text{[Math. 2]}$$

1: Set $n_2$ as the greatest even number equal to or smaller than n.

2: for each $i \in \{0, 2, . . . , n_2-2\}$

3: Calculate $[c_i c_{i+1}]$.

4: Set $m'_{00}:=m_{i,0}m_{i+1,0}$, $m'_{01}:=m_{i,0}m_{i+1,1}$, $m'_{10}:=m_{i,1}m_{i+1,0}$, and $m'_{11}:=m_{i,1}m_{i+1,1}$.

5: Calculate $[a_i]:=[c_i c_{i+1})](m_{00}+m_{11}-m_{01}-m_{10})+[c_i](m_{i+1,0}-m_{i,0})+[c_{i+1}](m_{i,1}-m_{i,0})+m_{i,0}$.

6: Calculate the following equation in real number multiplication.

However, when n is odd number, last right shift is not performed.

$$[A] := \left[ \prod_{i \in (0,2, . . . , n_2-2)} a_i \right] \qquad \text{[Math. 3]}$$

7: Select remaining $m_{n-1,0}$ and $m_{n-1,1}$ using $[c_{n-1}]$ when n is an odd number, multiply [A] by $m_{n-1,0}$ and $m_{n-1,1}$, and output a result.

The selective public multiplication executed in step 7 of algorithm 1 can be efficiently performed by using, for example, the following algorithm 2.

Algorithm 2: Multiplication of Required Right Shift Value by Selective Public Multiplier Input: [a], multipliers $m_0$ and $m_1$, condition [c]

Output: $[m_1 a]$ if c=1 and $[m_0 a]$ if c=0

1: Calculate $[m_1 a]$ and $[m_0 a]$.

2: Output $[c ? m_1 a : m_0 a]$ using an if-then-else gate.

The public value multiplication executed in step 1 of algorithm 2 can be efficiently performed, for example, by combining the following two algorithms.

Algorithm 3: Multiplication of Public Values at Same Time without Increasing Processing Cost from Right Shift Input: [x], multiplier in, shift amount $\sigma$ Output: [mx] after shift 1: Calculate a public value $2^\sigma/m$.

2: Calculate the following equation through public value division.

Here, [mx] is regarded as an expression the decimal point position of which is $\sigma$ lower than that of [x].

$$\frac{[x]}{\frac{2^\sigma}{m}} = [mx] \qquad \text{[Math. 4]}$$

Algorithm 4: Right Shift in Plurality of Divisors/Divisor Public Division

Input: [a], divisor $d_0$, $d_1$, . . . , $d_{n-1}$

Output: $[a/d_0]$, $[a/d_1]$, . . . , $[a/d_{n-1}]$

1: Obtain a quotient [q] of [a].

2: Use the quotient [q] to calculate and output $[a/d_i]$ for each i by right shift/public divisor division.

A quotient obtained in step 1 of algorithm 4 can be efficiently obtained by quotient transfer (see Reference 1).

Reference 1: Ryo Kikuchi, Dai Ikarashi, Takahiro Matsuda, Koki Hamada, and Koji Chida, "Efficient bit-decomposition and modulus-conversion protocols with an honest majority", Proceedings of Information Security and Privacy—23rd Australasian Conference (ACISP 2018), pp. 64-82, Jul. 11-13, 2018.

When simple selection from a binary table and multiplication are performed, selection of the two public values is performed offline, and thus, (n−1) real number multiplications are performed. In algorithm 1, n/2 integer multiplications and ((n/2)−1) real number multiplications are performed, and this is approximately n/2 right-shifts are efficient. Further, in algorithm 1, when n is an odd number, algorithm 2 is used and calculation of a fraction that cannot be combined with a four-value table is also efficient.

For reference, an algorithm for calculating an exponential function in secure computation using algorithm 1 is shown hereinafter.

Algorithm 5: Exponential Function Protocol

Input: [a]

Output: [exp (a)]

Parameter: t:=−1

1: Calculate $[a']:=[a]-\mu$.

2: Extract bits upper than t bits after a decimal point through bit decomposition and perform mod p conversion so that $[a'_0]$, . . . , $[a'_{u-1}]$ are obtained.

3: Set fi and εi as a mantissa part and an exponential part of $\exp(2^{i-t})$, with each $0 \leq i < u$.

4: Obtain a product [f'] with reference to the binary public table, with $[a'_0], \ldots, [a'_{u-1}]$ as a condition and 1, $f_0$, 1, $f_1, \ldots, 1, f_{u-1}$ as options.

5: Calculate the following equation using an if-then-else gate of option disclosure, with each $0 \leq i < u$.

$$[\varepsilon'_i] := \text{if } [a'_i] \text{ then } 2^{\varepsilon_i} \text{ else } 1 \qquad \text{[Math. 5]}$$

6: Calculate a product [ε'] of [ε'$_i$] for each i. This is a power of 2 of an exponential part of the upper bit part.

7: Calculate the following equation. This is the number indicated by a lower bit part.

$$[a'_\rho] := [a'] - \sum_{i<u} 2^{i-t}[a'_i] \qquad \text{[Math. 6]}$$

8: Calculate an exponential function $[\exp(a'_\rho)]$ for $[a'_\rho]$. A result is [w].

9: Calculate and output $[w][f'][\varepsilon'] \exp(\mu)$.

The multiplication by the selective public multiplier executed in step 4 of algorithm 3 can be efficiently performed by using algorithm 1.

Secure Selective Product Computation System 100

The secure selective product computation system 100 of the embodiment is an information processing system that executes the binary public table reference. The secure selective product computation system 100 includes N ($\geq 3$) secure computation apparatuses $1_1, \ldots, 1_N$, as illustrated in FIG. 1. In this embodiment, the secure computation apparatuses $1_1, \ldots, 1_N$ are connected to a communication network 9. The communication network 9 is a circuit-switched or packet-switched communication network configured so that respective connected apparatuses can communicate with each other and, for example, the Internet, a local area network (LAN), or a wide area network (WAN) is used. It is not necessary for each apparatus to be able to communicate online via the communication network 9. Each apparatus may be configured to store, for example, information to be input to a secure computation apparatus $1_n$ (n=1, . . . , N) in a portable recording medium such as a magnetic tape or a USB memory and input the information offline from the portable recording medium to the secure computation apparatus $1_n$.

Figure 2:
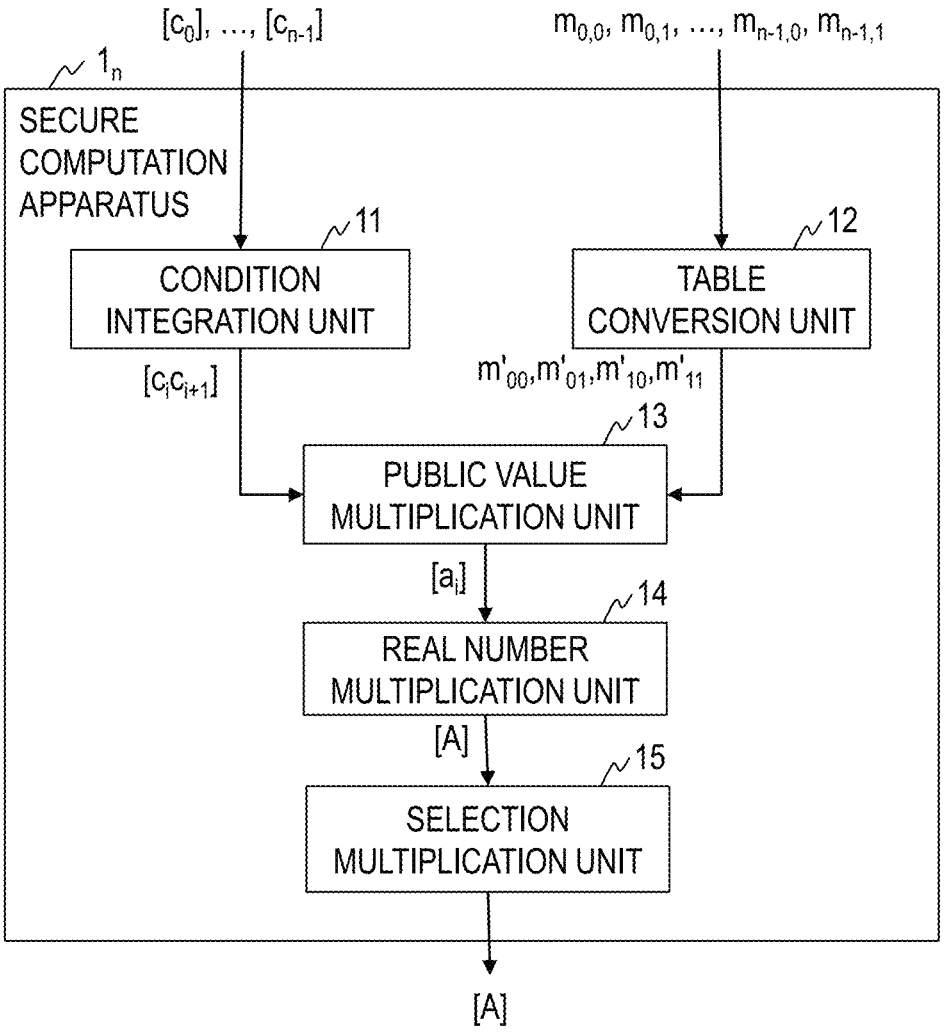
FIG. 2 is a diagram illustrating a functional configuration of a secure computation apparatus.

The secure computation apparatus $1_n$ included in the secure selective product computation system 100 of the embodiment includes, for example, a condition integration unit 11, a table conversion unit 12, a public value multiplication unit 13, a real number multiplication unit 14, and a selection multiplication unit 15, as illustrated in FIG. 2. The secure selective product computation method of the embodiment is realized by the secure computation apparatus $1_n$ performing processing of each step to be described below in cooperation with the other secure computation apparatus $1_{n'}$ (n'=1, . . . , N, where n≠n').

The secure computation apparatus $1_n$ is a special apparatus configured by loading a special program into a publicly known or dedicated computer including, for example, a central processing unit (CPU), a main storage device (RAM: Random Access Memory), and the like. The secure computation apparatus $1_n$ executes each process under the control of the central processing unit, for example. Data input to the secure computation apparatus $1_n$ or data obtained by each processing is stored in, for example, the main storage device, and the data stored in the main storage device is read to the central processing unit as needed, and used for other processing. At least a part of each processing unit of the secure computation apparatus $1_n$ may be configured by hardware such as an integrated circuit. Each storage unit included in the secure computation apparatus $1_n$ can be configured of, for example, a main storage device such as a random access memory (RAM), an auxiliary storage device configured of a hard disk, an optical disc, or a semiconductor memory element such as a flash memory, or middleware such as a relational database or a key value store.

Figure 3:
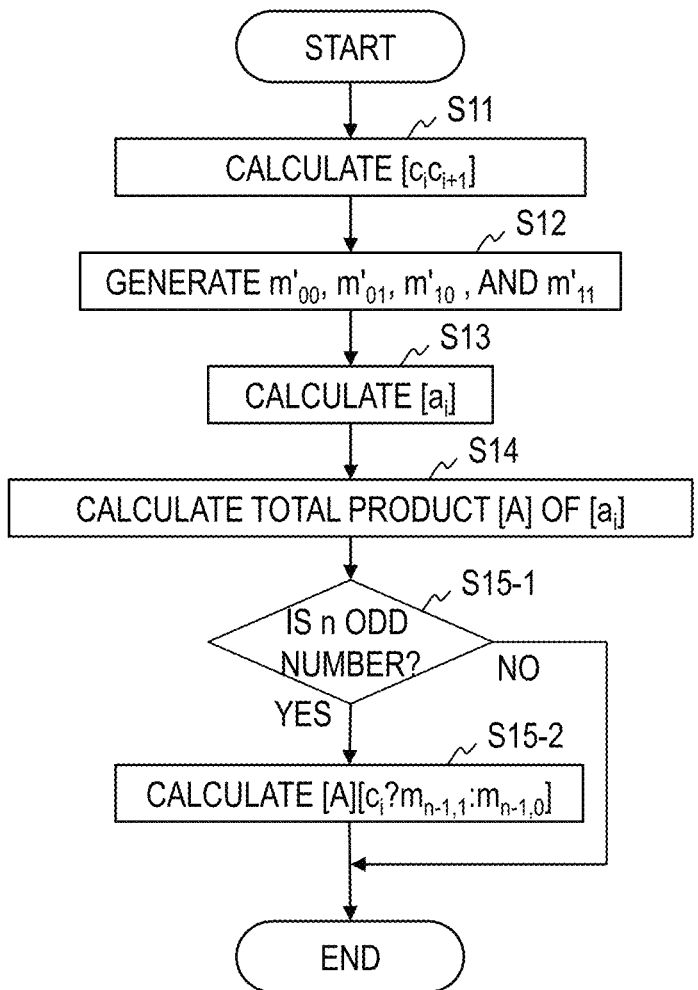
FIG. 3 is a diagram illustrating a processing procedure of a secure selective product computation method.

A processing procedure of the secure selective product computation method executed by the secure selective product computation system 100 of the embodiment will be described with reference to FIG. 3.

Hereinafter, $n_2$ is the greatest even number equal to or smaller than n. The following steps S11 to S13 are executed for each even number i equal to or greater than 0 and equal to or smaller than $n_2-2$.

In step S11, the condition integration unit 11 of each secure computation apparatus $1_n$ calculate a share value $[c_i c_{i+1}]$ of an integration condition $c_i c_{i+1}$ obtained by multiplying a share value $[c_i]$ of a condition $c_i$ by a share value $[c_{i+1}]$ of a condition $c_{i+1}$. The condition integration unit 11 outputs the share value $[c_i c_{i+1}]$ to the public value multiplication unit 13.

In step S12, the table conversion unit 12 of each secure computation apparatus $1_n$ generates a 4-value table including $m'_{00}, m'_{01}, m'_{10}$, and $m'_{11}$ where $m'_{00}:=m_{i,0}m_{i+1,0}, m'_{01}:=m_{i,0}m_{i+1,1}, m'_{10}:=m_{i,1}m_{i+1,0}$, and $m'_{11}:=m_{i,1}m_{i+1,1}$. The table conversion unit 12 outputs the 4-value table including $m'_{00}, m'_{01}, m'_{10}$, and $m'_{11}$ to the public value multiplication unit 13.

In step S13, the public value multiplication unit 13 of each secure computation apparatus $1_n$ calculates $[a_i] := [c_i c_{i+1}](m_{00}+m_{11}-m_{01}-m_{10})+[c_i](m_{i+1,0}-m_{i,0})+[c_{i+1}](m_{i,1}-m_{i,0})+m_{i,0}$. The public value multiplication unit 13 outputs the share value $[a_i]$ to the real number multiplication unit 14.

In step S14, the real number multiplication unit 14 of each secure computation apparatus $1_n$ calculates the share value [A] of the value A obtained by multiplying all the share values $[a_i]$. That is, the following equation is calculated. Because multiplication is a real number multiplication, it is necessary to last perform right shift, but when n is an odd number, the right shift is not performed herein.

$$[A] := \left[ \prod_{i \in (0,2,\ldots,n_2-2)} a_i \right] \qquad \text{[Math. 7]}$$

In step S15, if n is an odd number, the selection multiplication unit 15 of each secure computation apparatus $1_n$ selects $m_{n-1,1}$ when $c_{n-1}=1$ and $m_{n-1,0}$ when $c_{n-1}=0$, multiplies the share value [A] of the value A by $m_{n-1,1}$ or $m_{n-1,0}$, and outputs a result. That is, $[A][c_{n-1}?m_{n-1,1}m_{n-1,0}]$ is calculated.

Although the embodiment of the present invention has been described above, a specific configuration is not limited to this embodiment, and even when a design is appropriately changed, for example, without departing from the spirit of the present invention, it is obvious that this is included in the present invention. Various processing described in the embodiments may be not only executed in chronological order according to order of description, but may also be executed in parallel or individually according to a processing capacity of an apparatus that executes processing or as necessary.

Program and Recording Medium

Figure 4:
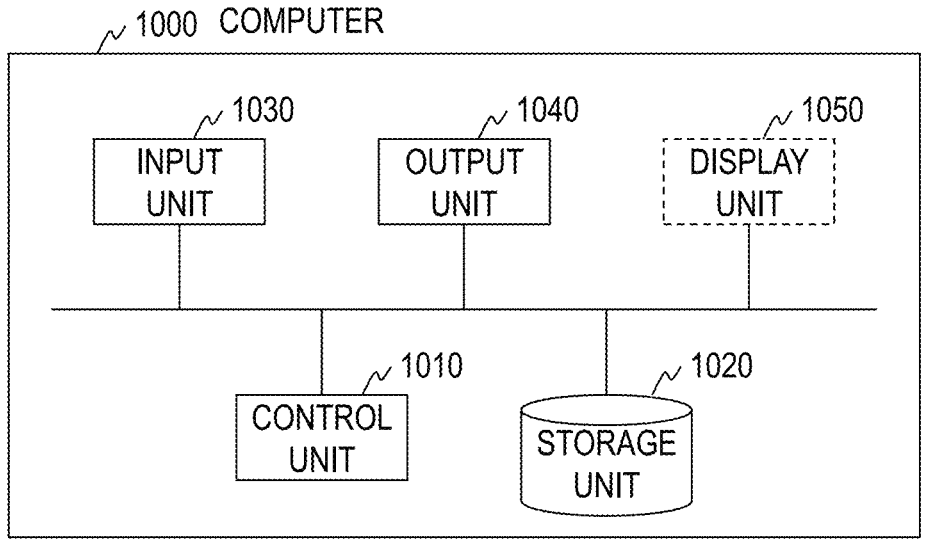
FIG. 4 is a diagram illustrating a functional configuration of a computer.

When various processing functions in each apparatus described in the above embodiment are realized by a computer, processing content of the function to be included in each apparatus is described by a program. This program is loaded into a storage unit 1020 of a computer illustrated in FIG. 4 and a control unit 1010, an input unit 1030, an output unit 1040, and the like are operated so that various processing functions in each of the above apparatuses are realized on the computer.

A program in which processing content thereof has been described can be recorded on a computer-readable recording medium. The computer-readable recording medium may be, for example, a magnetic recording device, an optical disc, a magneto-optical recording medium, or a semiconductor memory.

Further, distribution of this program is performed, for example, by selling, transferring, or renting a portable recording medium such as a DVD or CD-ROM on which the program has been recorded. Further, the program may be distributed by being stored in a storage device of a server computer and transferred from the server computer to another computer via a network.

The computer that executes such a program first temporarily stores, for example, the program recorded on the portable recording medium or the program transferred from the server computer in a storage device of the computer. When the computer executes the processing, the computer reads the program stored in the recording medium of the computer and executes processing according to the read program. Further, as another embodiment of the program, the computer may directly read the program from the portable recording medium and execute the processing according to the program, and further, processing according to a received program may be sequentially executed each time the program is transferred from the server computer to the computer. Further, a configuration may be adopted in which the above-described processing is executed by a so-called application service provider (ASP) type service for realizing a processing function according to only an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

Further, in this embodiment, although the present apparatus is configured by a predetermined program being executed on the computer, at least a part of processing content of thereof may be realized by hardware.

The invention claimed is:

1. A secure selective product computation system for receiving a sequence of share values $[c_0], \ldots, [c_{n-1}]$ of n conditions $c_0, \ldots, c_{n-1}$ and a binary table including multipliers $m_{0,0}, m_{0,1}, \ldots, m_{n-1,0}$, and $m_{n-1,1}$ associating two multipliers of the multipliers with each of the conditions as inputs, and outputting a share value $[A]$ of a total product of the multipliers selected according to the conditions, the secure selective product computation system comprising:

a plurality of secure computation apparatuses, wherein each secure computation apparatus of the plurality of secure computation apparatuses includes processing circuitry configured to:

calculate, in cooperation with others of the plurality of secure computation apparatuses via communications including transmitting and receiving data over a network, share values $[c_ic_{i+1}]$ obtained by multiplying the share values $[c_i]$ and the share values $[c_{i+1}]$ where i is an even number equal to or greater than 0 or smaller than n;

generate a 4-value table including $m'_{00}$, $m'_{01}$, $m'_{10}$, and $m'_{11}$ where $m'_{00}:=m_{i,0}m_{i+1,0}$, $m'_{01}:=m_{i,0}m_{i+1,1}$, $m'_{10}:=m_{i,1}m_{i+1,0}$, and $m'_{11}:=m_{i,1}m_{i+1,1}$ and i is an even number equal to or greater than 0 or smaller than n;

generate share values $[a_i]$ of values $a_i$ obtained by calculating $[c_ic_{i+1}](m_{00}+m_{11}-m_{01}-m_{10})+[c_i](m_{i+1,0}-m_{i,0})+[c_{i+1}](m_{i,1}-m_{i,0})+m_{i,0}$ where i is an even number equal to or greater than 0 or smaller than n;

calculate, in cooperation with others of the plurality of secure computation apparatuses via communications including transmitting and receiving data over the network, a share value $[A]$ of a value A obtained by multiplying all the share values $[a_i]$; and multiply, in cooperation with others of the plurality of secure computation apparatuses via communications including transmitting and receiving data over the network, the share value $[A]$ by a multiplier selected from multipliers $m_{n-1,1}$ and $m_{n-1,0}$ according to a condition $c_{n-1}$ when n is an odd number.

2. A secure selective product computation method executed by a secure selective product computation system for receiving a sequence of share values $[c_0], \ldots, [c_{n-1}]$ of n conditions $c_0, \ldots, c_{n-1}$ and a binary table including multipliers $m_{0,0}, m_{0,1}, \ldots, m_{n-1,0}$, and $m_{n-1,1}$ associating two multipliers of the multipliers with each of the conditions as inputs, and outputting a share value $[A]$ of a total product of the multipliers selected according to the conditions, the secure selective product computation system including a plurality of secure computation apparatuses, the secure selective product computation method comprising:

calculating, by processing circuitry of each secure computation apparatus of the plurality of secure computation apparatuses in cooperation with others of the plurality of secure computation apparatuses via communications including transmitting and receiving data over a network, share values $[c_ic_{i+1}]$ obtained by multiplying the share values $[c_i]$ and the share values $[c_{i+1}]$ where i is an even number equal to or greater than 0 or smaller than n;

generating, by the processing circuitry of each of the plurality of secure computation apparatuses, a 4-value table including $m'_{00}$, $m'_{01}$, $m'_{10}$, and $m'_{11}$ where $m'_{00}:=m_{i,0}m_{i+1,0}$, $m'_{01}:=m_{i,0}m_{i+1,1}$, $m'_{10}:=m_{i,1}m_{i+1,0}$, and $m'_{11}:=m_{i,1}m_{i+1,1}$ where i is an even number equal to or greater than 0 or smaller than n;

generating, by the processing circuitry of each of the plurality of secure computation apparatuses, share values $[a_i]$ of values $a_i$ obtained by calculating $[c_ic_{i+1}](m_{00}+m_{11}-m_{01}-m_{10})+[c_i](m_{i+1,0}-m_{i,0})+[c_{i+1}](m_{i,1}-m_{i,0})+m_{i,0}$ where i is an even number i equal to or greater than 0 or smaller than n;

calculating, by the processing circuitry of each secure computation apparatus of the plurality of secure computation apparatuses in cooperation with others of the plurality of secure computation apparatuses via communications including transmitting and receiving data over the network, a share value $[A]$ of a value A obtained by multiplying all the share values $[a_i]$; and multiplying, by the processing circuitry of each secure computation apparatus of the plurality of secure computation apparatuses in cooperation with others of the plurality of secure computation apparatuses via communications including transmitting and receiving data over the network, the share value [A] by a multiplier selected from multipliers $m_{n-1,1}$ and $m_{n-1,0}$ according to a condition $c_{n-1}$ when n is an odd number.

3. A non-transitory computer recording medium storing computer executable instructions which cause the plurality of secure computation apparatuses to perform the secure selective product computation method of claim 2.

* * * * *